4 Sheets—Sheet 1.
G. W. GRADER.
MACHINE FOR LINTING AND RELINTING COTTON SEEDS AND MOTES.
No. 94,304. Patented Aug. 31, 1869.
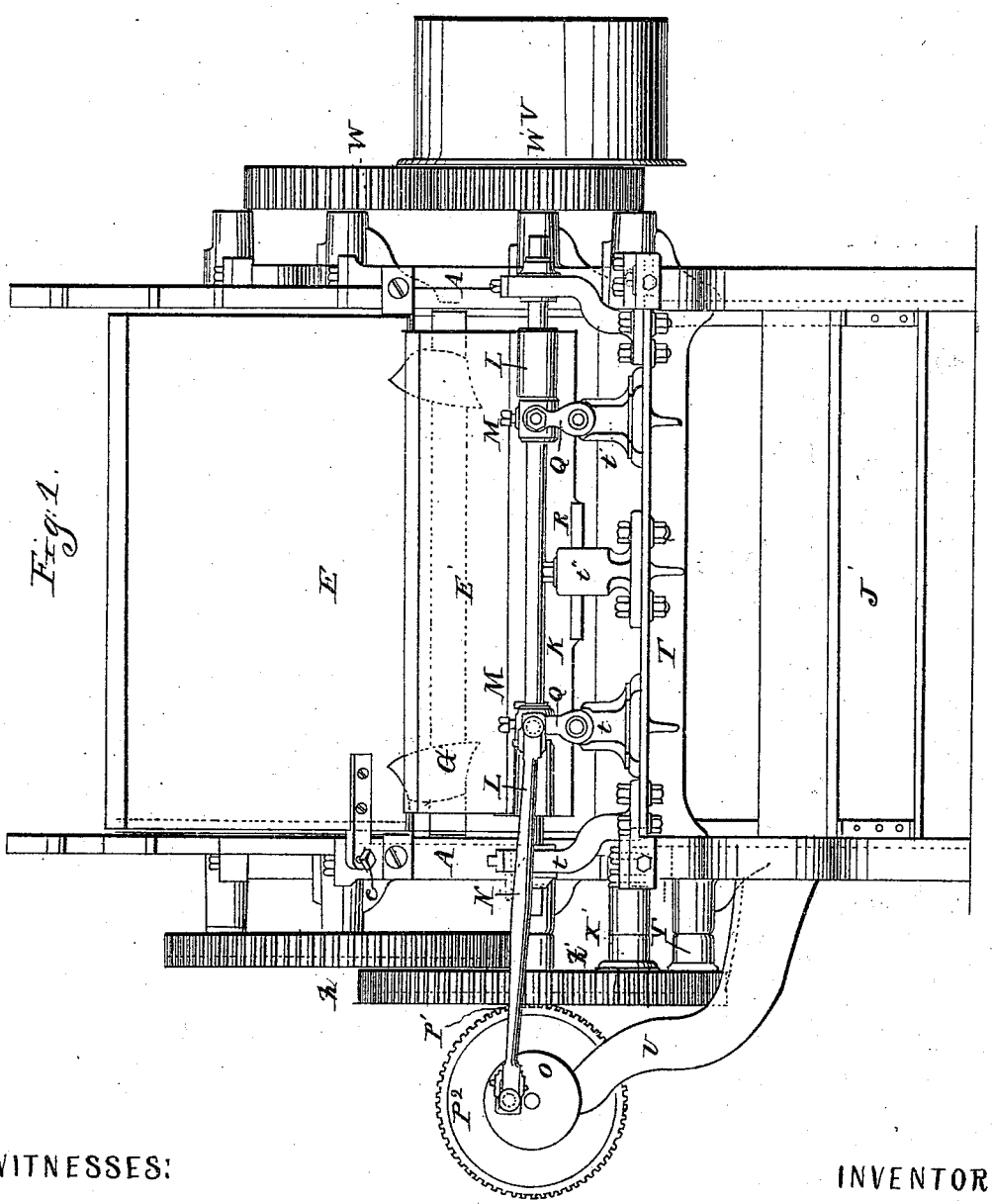
WITNESSES:
W. B. Deming
John Grinnell
INVENTOR:
Geo. W. Grader
by Kim ghr & attys

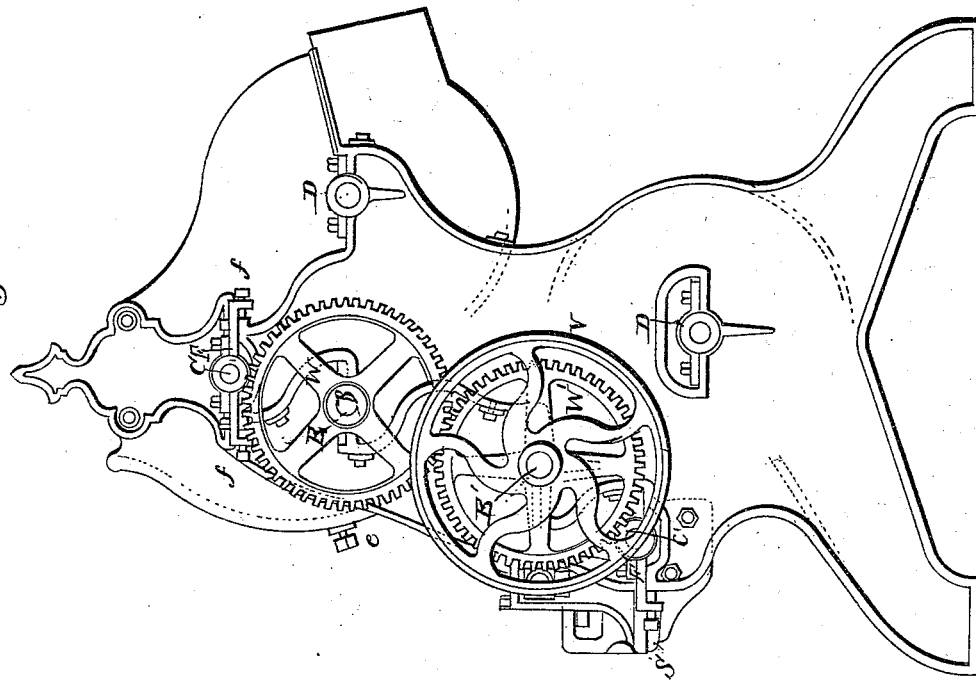
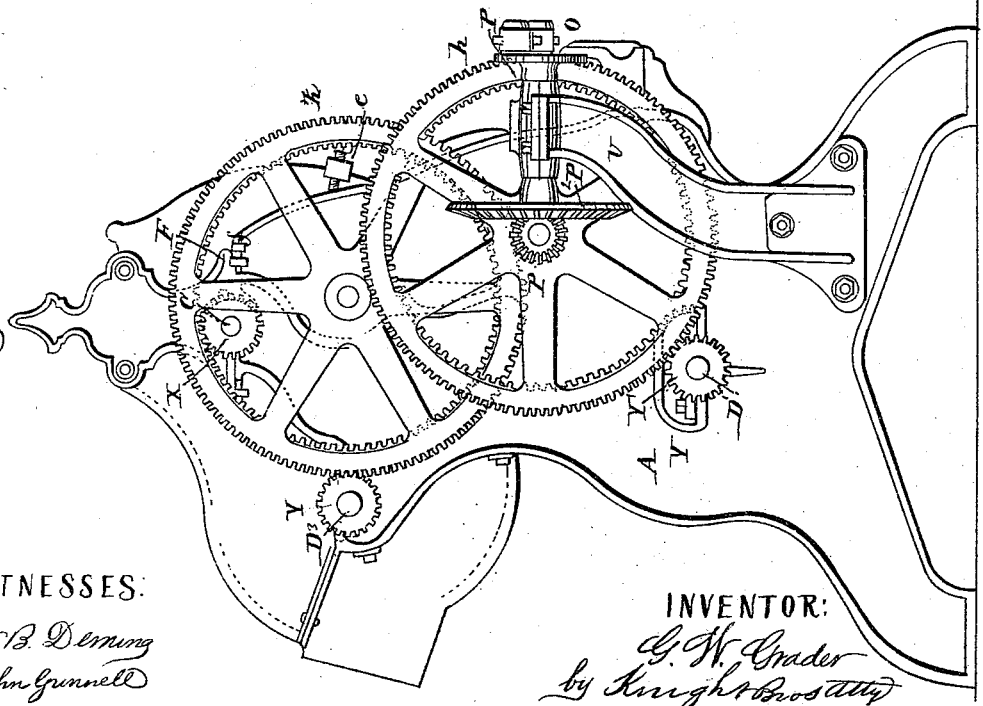

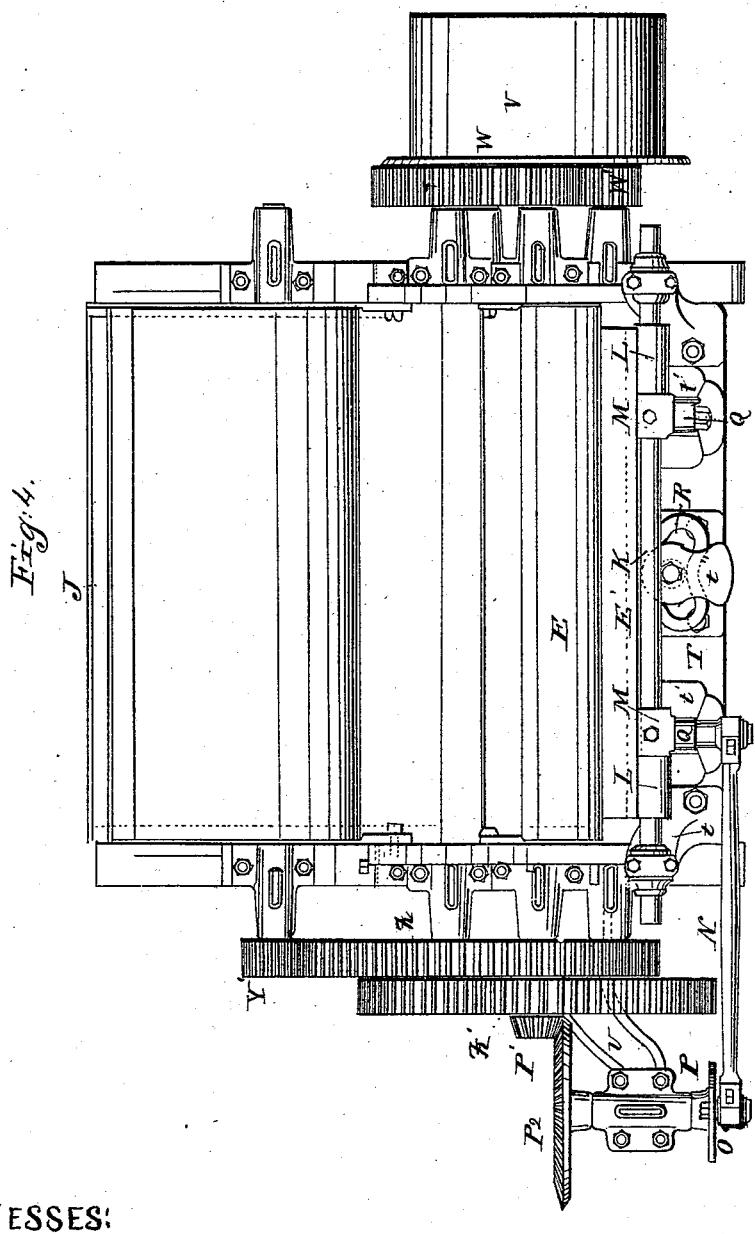

G. W. GRADER.
MACHINE FOR LINTING AND RELINTING COTTON SEEDS AND MOTES.
No. 94,304. Patented Aug. 31, 1869.
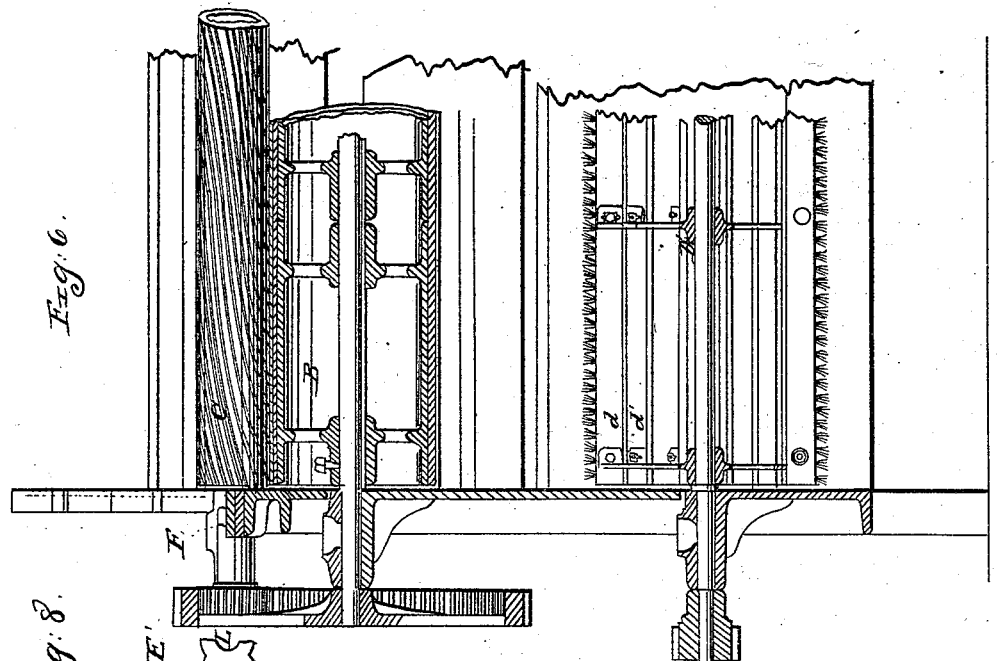
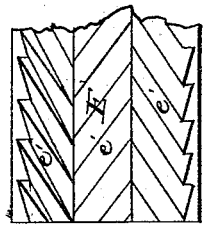
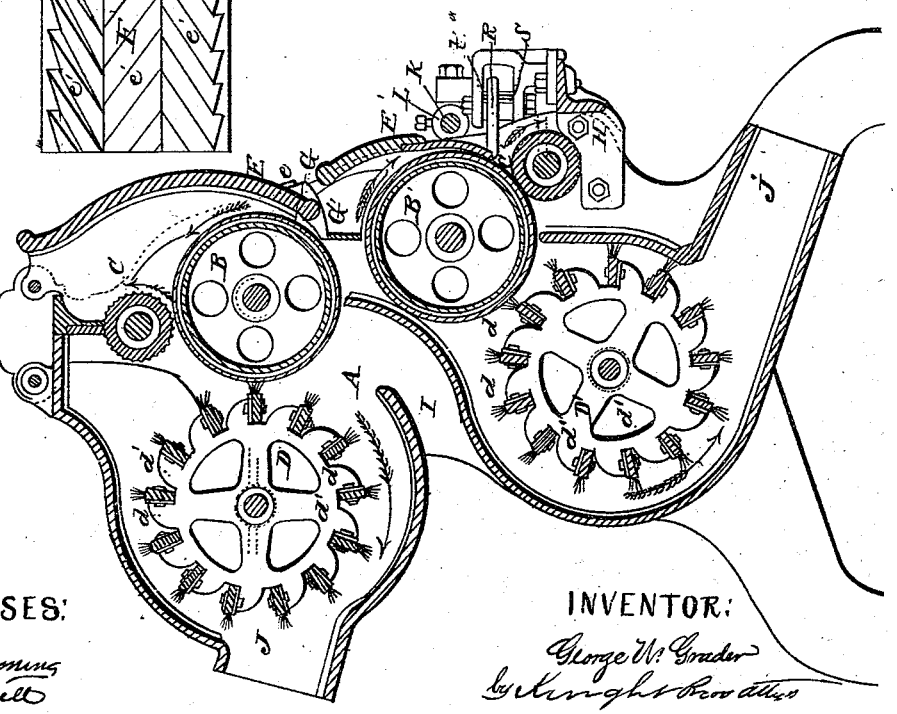
WITNESSES:
W B Deming
John Gunnell
INVENTOR:
George W. Grader
by Knight Bros attys

United States Patent Office.

GEORGE W. GRADER, OF MEMPHIS, TENNESSEE, ASSIGNOR TO HIMSELF AND WILLIAM B. WIGGS, OF SAME PLACE.

Letters Patent No. 94,304, dated August 31, 1869.

---

IMPROVED MACHINE FOR LINTING AND RELINTING COTTON-SEEDS AND MOTES.

---

The Schedule referred to in these Letters Patent and making part of the same.

---

*To all whom it may concern:*

Be it known that I, GEORGE W. GRADER, of Memphis, in the county of Shelby, and State of Tennessee, have invented a new and useful Machine for Linting and Relinting Cotton-Seed and Motes; and I do hereby declare the following to be a sufficiently full, clear, and exact description of the same, to enable one skilled in the art to which my invention appertains to carry it into effect, reference being had to the accompanying drawings, which are made part of this specification.

The objects of my invention are—

First, to effect the complete removal of the lint or fibre and the cleaning of the seed and motes in a single compact machine;

Second, to separate the different qualities or grades of lint or fibre; and

Third, to adapt the wear of the machine to be readily compensated for and its action regulated.

Two ginning-cylinders and their accessories are arranged in a suitable casing, in such relative position and so operated as that the seed and motes, after the long lint or fibre has been removed by the first, passing to the other, shall have the removal of the lint or fibre entirely completed; the breast or concave of the second or last cylinder being constructed with a rasp-surface and peculiarly vibrated, for the purpose of insuring the perfect cleansing of the seed and motes by rolling them on said cylinder, and thus bringing all their surfaces in contact therewith, and suitable shields or guides employed to retain the seed and motes at the centre of said cylinder and prevent their escape at the ends of the vibrating breast thereof.

The casing is provided on opposite sides, with two discharge-apertures for the lint or fibre, so arranged as that the lint or fibre removed by each cylinder is discharged separately through them.

The strips or brushes of the brush-cylinders are held by transverse bolts passing through radial slots in the heads of said cylinders, and are thus adapted to be adjusted to compensate for wear, or to regulate their action on the ginning-cylinders as required, and the rollers employed to throw back the seed from the ginning-cylinders made adjustable relatively thereto for said purposes.

In the drawings—

Figure 1 represents a front elevation of a machine illustrating my invention;

Figures 2 and 3, elevations of the respective ends thereof;

Figure 4, a plan view;

Figure 5, a vertical transverse section;

Figure 6, a vertical longitudinal section of one end; and

Figures 7 and 8 respectively, a face view and transverse section, on an enlarged scale, of the vibrating breast or concave of the second cylinder, detached.

Similar letters of reference indicate like parts in the several figures.

A represents the casing, which may be constructed of the usual or any suitable material, in suitable manner, and of any suitable form to adapt it for the reception of the operative parts of the machine, and to receive and discharge the lint or fibre and seed and motes, as herein described;

B B' represent the ginning-cylinders;

C C', the rollers for throwing back the seed and motes;

D D', the brush-cylinders; and

E E', the breasts of the two ginning-cylinders.

The cylinders B B' and rollers C C' may be of any usual or other suitable form, but are preferably constructed respectively (the cylinders) with wire teeth, secured in place by means of soft metal cast around them, as described in the expired patent of John L. Tuttle, granted October 30, 1849, or in other suitable manner, and (the rollers) with longitudinal spiral grooves, as in the form in common use.

The brush-cylinders D D' are preferably constructed with cast heads, provided with suitable radial shoulders on their peripheries, for the support of the brushes or "strips" which are held up to them by means of transverse bolts $d$ (figs. 5 and 6) passing through radially-elongated slots in lugs $d'$, on the inner sides of the heads, this construction adapting said cylinder to be expanded to compensate for wear, and to regulate the action of the brushes on the ginning-cylinders.

The rollers C C' are also preferably made adjustable relatively to the ginning-cylinders, by being mounted in sliding boxes F F', adjustable by means of screws $f f'$ passing through their down-turned ends and bearing against the supports of the boxes, as shown, or in other suitable manner, to regulate their action as required.

The breast E is constructed of the usual or any suitable form to adapt it to receive the seed-cotton and feed it to the ginning-cylinder B.

The breast E' is preferably constructed with a rasp-face, as represented in figs. 7 and 8, and vibrated vertically and horizontally, being guided in its vertical movement concentrically with the cylinder B, as hereinafter more particularly described.

The two sets of separating-devices B, C, D, E, and B', C', D', E', being arranged relatively to each other, and operating substantially as indicated in fig. 5, the seed and motes, as separated by the former, pass, by a suitably-arranged passage, G, to the latter, where the removal of the lint or fibre therefrom is completed, and said seed and motes discharged through a passage, H, into a suitable receptacle, the dirt and dust separated by the first set falling through an opening, $l$, and the lint or fibre removed by each being separately discharged through apertures J J', the currents of air produced by the brush-cylinders serving for the latter purpose, as in the common gins.

$e$ represents a set-screw or adjustable stop, attached to the breast E, at a suitable point below its hinge, and abutting against the edge of one of the ends of the casing, employed to regulate the distance of said breast from the cylinder B, and the consequent area of the passage G, and rapidity of the discharge of the seed and motes therethrough, as required.

G' represents a shield or guide applied in the space below the passage G, between the cylinders B and B', to confine the seed and motes to the front and centre of the cylinder B', and thus prevent its escape at the ends of the breast E', and behind said cylinder B', and secure the perfect treatment of it all.

K represents a horizontal shaft, which is mounted in vertically-sliding boxes, and allowed an axial or longitudinal motion therein, for a purpose which will presently appear.

The breast E' is hinged to the shaft K by means of lugs L L, and connected therewith, so as to receive a horizontal longitudinal movement through it by means of collars M M attached to said shaft, between the lugs L L, the object of said shaft being to guide said breast in said longitudinal movement, and to support it in front, and at the same time to permit a vertical curvilinear movement thereto, hereinafter described.

N represents a rod or pitman, connecting the breast E' to the wrist of a crank-disk O, on the end of a rotary shaft, P, at right angles to said shaft K, to impart to it the described longitudinal reciprocation, being preferably connected thereto by means of one of the collars M, shaft K, and lugs L, as shown.

Q Q represent vertical links, connecting the lower edge of the breast E' with the frame of the machine, being preferably attached to the former through one of the collars M, the shaft K, and lugs L, as shown.

R represents a projection at the lower edge of said breast, having a curved slot in the form of an arc, with a sine parallel with the shaft K, and of a length equal to its (the breast E''s) longitudinal movement; and S, a stationary stud or friction-roller, occupying the slot in the projection R, and traversing it in said longitudinal movement of the breast.

The effect of these provisions is to produce from the horizontal longitudinal movement, imparted definitely to said breast, in addition to said movement, a vertical movement in a curved path, which is made concentric with the cylinder B', or nearly so, by a proper adjustment of the curve of the slot in the projection R, relatively to the extent of the vertical movement, said extent being determined by the links Q and the extent of horizontal movement, which latter is determined by the stroke of the crank-disk O.

A table or shelf, T, attached to the ends of the casing A, and extending across its front, may afford a base for brackets or standards $t\ t'\ t''$, for the reception or support, respectively, of the sliding boxes of the shaft K, the links Q, and the stud S.

An arm or bracket, U, attached to one end of the casing, and provided with a suitable box at its upper extremity, may form the support of the shaft P.

The rasp-face of the breast E', as shown most clearly in figs. 7 and 8, is composed of zigzag teeth or projections, $e'$, having square upper surfaces and bevelled lower surfaces, and inclined alternately toward opposite ends of the breast, as represented.

That portion only of the breast E', provided with the rasp-surface, may be made of metal, the remainder being made of wood, and suitably attached thereto, as shown, or the whole may be made of metal in suitable manner.

The provision of the breast E' with the rasp-face, as described, causes it to hold the seed and motes in contact with the final ginning-cylinder, and roll them over its surface.

The latter result is further secured by the vibration of said breast, as described, the seed being thereby rolled back and forth over the surface of the cylinder, and all their various surfaces brought in contact therewith, thereby securing the removal of every portion of the lint or fibre, without liability of the seed being crushed or becoming jammed between the cylinder and breast.

V represents the driving-pulley, which, as shown, is on one end of the shaft of the cylinder B'.

W W' represent spur-gears on the shafts of the cylinders B B' respectively, and on the same end of the machine as the driving-pulley V, for connecting said cylinders.

X X' Y Y' represent pinions on the shafts of the rollers C and C', and the shafts of the brush-cylinders D and D' respectively, and on the opposite end of the machine to the wheels W W'; and Z Z' represent double or internally and externally-geared spur-wheels on the shafts of the cylinders B and B' respectively, imparting their movement to said pinions X Y and X' Y' respectively, X and X' meshing with their internal gear, and Y and Y' with their external gear, as shown.

The rollers C C' and brush-cylinders D D' thus receive movement at a proper relative rate of speed.

$P^1$ represents a bevel-pinion, on the same end of the shaft of the cylinder B' as the spur-wheel Z, (external thereto,) and $P^2$ a corresponding bevel-gear on the shaft P of the crank-disk O, by which the breast E is vibrated, and which thus receives its motion.

The adjustable boxes of the rollers C C, sliding horizontally, as shown, or concentrically, or nearly so, with the spur-wheel Z Z', adapt their adjustment to be made without injuriously affecting the mesh of the pinions W W'.

The gearing may all obviously be arranged on one end of the machine, if preferred, or a suitable arrangement of belts and pulleys substituted therefor.

The precise construction, combination, and arrangement of parts shown and described may also obviously be varied as required for different purposes.

Having thus described my invention,

The following is what I claim as new therein, and desire to secure by Letters Patent:

1. The combination and arrangement of two ginning-cylinders B B' and their accessories, the first for removing the long lint or fibre, and the second to complete the cleaning of the seed and motes, substantially as herein described.

2. In combination with the two sets of devices for successively treating the seed and motes for the removal of the lint or fibre, as described, the separate lint or fibre-discharges, arranged and employed substantially as and for the purpose set forth.

3. The breast E', constructed with the rasp-face, composed of zigzag teeth or projections, $e'$, as described, for the purpose explained.

4. In combination with the breast E', the shaft K, mounted in vertically-sliding boxes, as described, the crank disk O, connecting-rod N, links Q, slotted projection R, and stud S, arranged and adapted to operate substantially as described.

5. In combination with the ginning-cylinder B', the shield or fender G', constructed and arranged relatively to said cylinder B', and its vibrating breast E', substantially as represented and described, for the purpose set forth.

6. In the described combination with the ginning-cylinders B B', the rollers C C', for throwing back the seed when the lint or fibre is separated, when mounted in sliding boxes F, so as to be capable of adjustment relatively to said ginning-cylinders, as and for the purposes set forth.

7. The boxes F of the rollers C C', adapted to slide transversely on their supports, and constructed with down-turned ends or lugs, traversed by adjustable set-screws $f f'$, bearing against the ends or sides of their supports, as shown and described, to adjust them on said supports, as set forth.

8. The brush-cylinders D D', having their heads constructed for the reception of the strips or brushes, with radial shoulders or supports on their peripheries, and on their inner sides with radially-slotted lugs or flanges $d$, and the strips or brushes secured by transverse bolts $d'$ passing through the slots in the lugs or flanges $d$, as shown and described, for the purposes set forth.

GEO. W. GRADER.

Witnesses:
F. F. MARBURY,
EDWD. HARTNAGLE.